UNITED STATES PATENT OFFICE.

HEINRICH von HOCHSTETTER, OF CONSTANCE, GERMANY, ASSIGNOR TO THE FIRM OF HOLZVERKOHLUNGS-INDUSTRIE AKTIEN-GESELLSCHAFT, OF CONSTANCE, BADENIA, GERMANY, A CORPORATION OF GERMANY.

PROCESS FOR THE DRY DISTILLATION OF MATERIALS CONTAINING CELLULOSE.

1,241,789.  Specification of Letters Patent.  Patented Oct. 2, 1917.

No Drawing.  Application filed April 2, 1913.  Serial No. 758,438.

*To all whom it may concern:*

Be it known that I, HEINRICH VON HOCHSTETTER, a subject of the Emperor of Austria, and resident of Constance, Badenia, Germany, have invented certain new and useful Improvements in Processes for the Dry Distillation of Materials Containing Cellulose, of which the following is a specification.

Various processes and apparatus have been used in the wood charring industry for the dry distillation of cellulose containing materials but the mode of operation in all the processes is practically the same and is characterized by three different stages (see M. Klar, *Technologie of Wood Charring*, Berlin, Julius Springer, 1910, page 100) which are as follows:—

The initial stage which is the period of drying and heating the wood to 280 degrees centigrade. The intermediate stage of the charring proper and the final stage which consists in the concentration of the carbon content in the charcoal, and therefore the heating of the latter from 280 to about 400 degrees centigrade.

During the initial and final periods a large quantity of heat has been hitherto supplied while the intermediate period of the charring proper of the wood required but little or no supply of heat (see Klar page 100, line 9 from the end of the page).

In following this mode of operation, in which the charring period proper was not at all or but little influenced by the heat supply the yield of acetate of lime was always the same within certain limits in spite of the numerous and varied forms of apparatus. It was even supposed that the slower the distillation process was carried out, the greater would be the yield of acetic acid (see Muspratt, *Techn. Chemie*, Vol. II, 1889, p. 1842, lines 22 *et seq.*)

In contradistinction to this view the surprising observation has now been made, that the yield of acetate of lime undergoes a considerable increase, if the charring period proper (the period of self-charring) be made as short as possible, *i. e.*, that as soon as one notices any sign of an exothermic reaction taking place within the retort the supply of heat is so considerably and forcefully increased that from this time on the temperature prevailing in the retort for the further run of the distillation is about 400° centigrade or higher. In accordance with this invention this result is obtained by supplying either directly or indirectly such considerable quantities of heat to the wood to be charred during the distillation period, that the distillation of the gases of the gasifiable constituents is effected in a considerably shorter period of time. The yield of wood spirit is in nowise affected by this mode of operation. Although the application of heat for the condensation of the distillates is somewhat greater than that used in the older mode of operation, this is compensated for by the greater yield of acetic acid. Moreover the new distillation process possesses the further important advantage, that in consequence of the reduction of time occupied by the distillation considerably more wood can be dealt with in a given apparatus, than has been the case hitherto.

In the hereinbefore described process, care must of course be taken to avoid any injurious overheating of the material to be charred.

I claim:

1. The process of distilling hardwood for the production of acetic acid, alcohol and charcoal which comprises continuously supplying heat during the period of exothermic reaction within the retort.

2. The process of distilling hardwood for the production of acetic acid, alcohol and charcoal which comprises raising the temperature within the retort at the beginning of the period of exothermic reaction to approximately 400° C. and maintaining that temperature throughout the process.

In testimony whereof I have signed my name to this specification in the presence of two subscribing witnesses.

HEINRICH von HOCHSTETTER.

Witnesses:
 FRITZ SCHAEFFER,
 FRANCES R. JEWETT.